(12) United States Patent
Livni et al.

(10) Patent No.: US 8,677,134 B2
(45) Date of Patent: Mar. 18, 2014

(54) HTTP SIGNING

(75) Inventors: Felix Livni, Seattle, WA (US); Hao Chen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 320 days.

(21) Appl. No.: 12/944,649

(22) Filed: Nov. 11, 2010

(65) Prior Publication Data

US 2012/0124384 A1 May 17, 2012

(51) Int. Cl.
*H04L 9/32* (2006.01)

(52) U.S. Cl.
USPC ................ 713/178; 713/176; 713/181

(58) Field of Classification Search
USPC ........................ 713/176, 178, 181
See application file for complete search history.

(56) References Cited

U.S. PATENT DOCUMENTS

| | | | | |
|---|---|---|---|---|
| 5,694,472 | A * | 12/1997 | Johnson et al. | 713/189 |
| 7,366,781 | B2 | 4/2008 | Abjanic | |
| 7,465,231 | B2 * | 12/2008 | Lewin et al. | 463/37 |
| 7,509,496 | B2 | 3/2009 | Skog et al. | |
| 7,552,220 | B2 * | 6/2009 | Marmigere et al. | 709/228 |
| 7,716,243 | B2 * | 5/2010 | Schwartz et al. | 707/783 |
| 7,797,543 | B1 * | 9/2010 | Campbell et al. | 713/178 |
| 2002/0056042 | A1 * | 5/2002 | van der Kaay et al. | 713/178 |
| 2002/0120851 | A1 * | 8/2002 | Clarke | 713/178 |
| 2002/0199013 | A1 | 12/2002 | Sorensen | |
| 2003/0065653 | A1 * | 4/2003 | Overton et al. | 707/3 |
| 2005/0204037 | A1 | 9/2005 | Levy | |
| 2006/0161986 | A1 | 7/2006 | Singh et al. | |
| 2006/0277607 | A1 | 12/2006 | Chung | |
| 2008/0098232 | A1 * | 4/2008 | Miyazaki et al. | 713/176 |
| 2010/0057583 | A1 * | 3/2010 | Jeffs et al. | 705/26 |
| 2010/0088398 | A1 * | 4/2010 | Plamondon | 709/220 |
| 2010/0146640 | A1 * | 6/2010 | Wang et al. | 726/31 |
| 2010/0211793 | A1 * | 8/2010 | Park et al. | 713/176 |
| 2012/0117641 | A1 * | 5/2012 | Holloway et al. | 726/12 |

OTHER PUBLICATIONS

Koskela, et al. "Securing Web Content." Proceedings of the 2009 workshop on Re-architecting the Internet, Dec. 1-4, 2009, pp. 7-12. ACM: Rome, Italy.

* cited by examiner

*Primary Examiner* — Joon H Hwang
*Assistant Examiner* — Johnny Aguiar
(74) *Attorney, Agent, or Firm* — Judy Yee; Sade Fashokun; Micky Minhas

(57) ABSTRACT

A system and method for signing data transferred over a computer network is described. In one aspect, the HTTP header of an HTTP response message is extended to include a content identifier, a content expiration time, and a digital signature. The digital signature may be generated from the content identifier, the content expiration time, and the message body of the HTTP response message.

17 Claims, 11 Drawing Sheets

402

```
GET /path/gamename.html HTTP/1.1
Host: www.gameserver.com
Connection: keep-alive
```

404

```
HTTP/1.1 200 OK
Age: 30
Date: Tue, 26 Oct 2010 16:00:00 GMT
Expires: Tue, 26 Oct 2010 18:00:00 GMT
Cache-Control: public
Content-Type: text
Connection: close
Content-Length: 248
Server: Brussels
X-HTTPSig-Expires: Tue, 26 Oct 2010 17:00:00 GMT
X-HTTPSig-Urn: urn:path:gameupdates:gamename
X-HTTPSig-Signature: X/RHRS/Z/VGEcZsSu5Am9=

<HTTP message body>
```

HTTP SIGNING

BACKGROUND

In order to reduce design complexity, most computer networks are designed using a hierarchy of protocol layers, with each layer built upon the one below it. For example, the International Standard Organization's Open Systems Interconnection (ISO/OSI) reference model contains seven protocol layers. The top-most layer in the ISO/OSI model is the application protocol layer. Well-known application layer protocols include the Hypertext Transfer Protocol (HTTP), the File Transfer Protocol (FTP), the Telnet protocol, and the Simple Mail Transfer Protocol (SMTP).

The HTTP protocol is commonly used for fetching webpages and other files (e.g., text, software, images, video, audio, and other multimedia files) over the Internet. HTTP is a stateless request-response protocol that provides a structure for the message requests sent from clients to servers, and the message responses sent from servers to clients. For example, a client may be a web browser and a server may be an application running on a computing device hosting a web site. The client may submit an HTTP request to the server identified by a particular IP address, which in turn sends an HTTP response message back to the client. Typically, an end user of the HTTP client initiates an HTTP request by typing in a Uniform Resource Locator (URL) or selecting a hypertext link. The HTTP response message may contain information regarding the status of the request and/or the content requested by the client.

One method of delivering content over HTTP to end users in an efficient manner is to use a Content Delivery Network (CDN). A CDN comprises a collection of servers that may be optimized to deliver content to clients based on some measure of network proximity. The CDN servers, which are distributed across multiple locations, contain copies of a particular content to be distributed. The particular CDN server selected for delivering the particular content to a client may be the server with the fewest network hops or the server with the quickest response time. One problem with using CDNs to distribute content is that for some content the costs to support a Secure Socket Layer (SSL) connection or other secure connection may be cost prohibitive.

SUMMARY

Technology is described for generating and verifying signed data transferred over a computer network. Data may be signed using a digital signature. The digital signature may be sent along with the data being transferred over the computer network. The digital signature allows a recipient of the signed data to determine whether the data was created by a known sender, and that the data was not altered while in transit from the sender. The ability to detect forgery and/or tampering of data being transferred over HTTP is particularly useful when the cost of supporting a secure connection is cost prohibitive (e.g., using content delivery networks to distribute certain types of content). In one embodiment, the HTTP header of an HTTP response message is extended to include a content identifier, a content expiration time, and a digital signature. The digital signature may be generated from the content identifier, the content expiration time, and the message body of the HTTP response message.

One example of a method for generating signed data includes receiving a request for a first resource, generating a content identifier for the first resource, generating a content expiration time for the first resource, generating a digital signature, embedding the digital signature into a response header, and transmitting a response message including the response header. The digital signature may be based on the content identifier, content expiration time, and the first resource.

One example of a method for verifying signed data includes receiving an HTTP response message including a digital signature, decrypting the digital signature, and comparing the decrypted digital signature to portions of the HTTP response message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 depicts one embodiment of an HTTP request message and an associated HTTP response message.

DETAILED DESCRIPTION

Technology is described for generating and verifying signed data transferred over a computer network. Data may be signed using a digital signature. The digital signature may be sent along with the data being transferred over the computer network. The digital signature allows a recipient of the signed data to determine whether the data was created by a known sender, and that the data was not altered while in transit from the sender. The ability to detect forgery and/or tampering of data being transferred over HTTP is particularly useful when the cost of supporting a secure connection is cost prohibitive (e.g., using content delivery networks to distribute certain types of content). In one embodiment, the HTTP header of an HTTP response message is extended to include a content identifier, a content expiration time, and a digital signature. The digital signature may be generated from the content identifier, the content expiration time, and the message body of the HTTP response message.

The disclosed technology provides a way for game console manufacturers or other entities to control and/or authenticate downloaded games, game updates, and other media capable of being played on the game console. Although primarily described with regards to HTTP, the disclosed technology may also be practiced in other client-server environments that use network protocols that include headers and/or header extensions.

Figure 1:
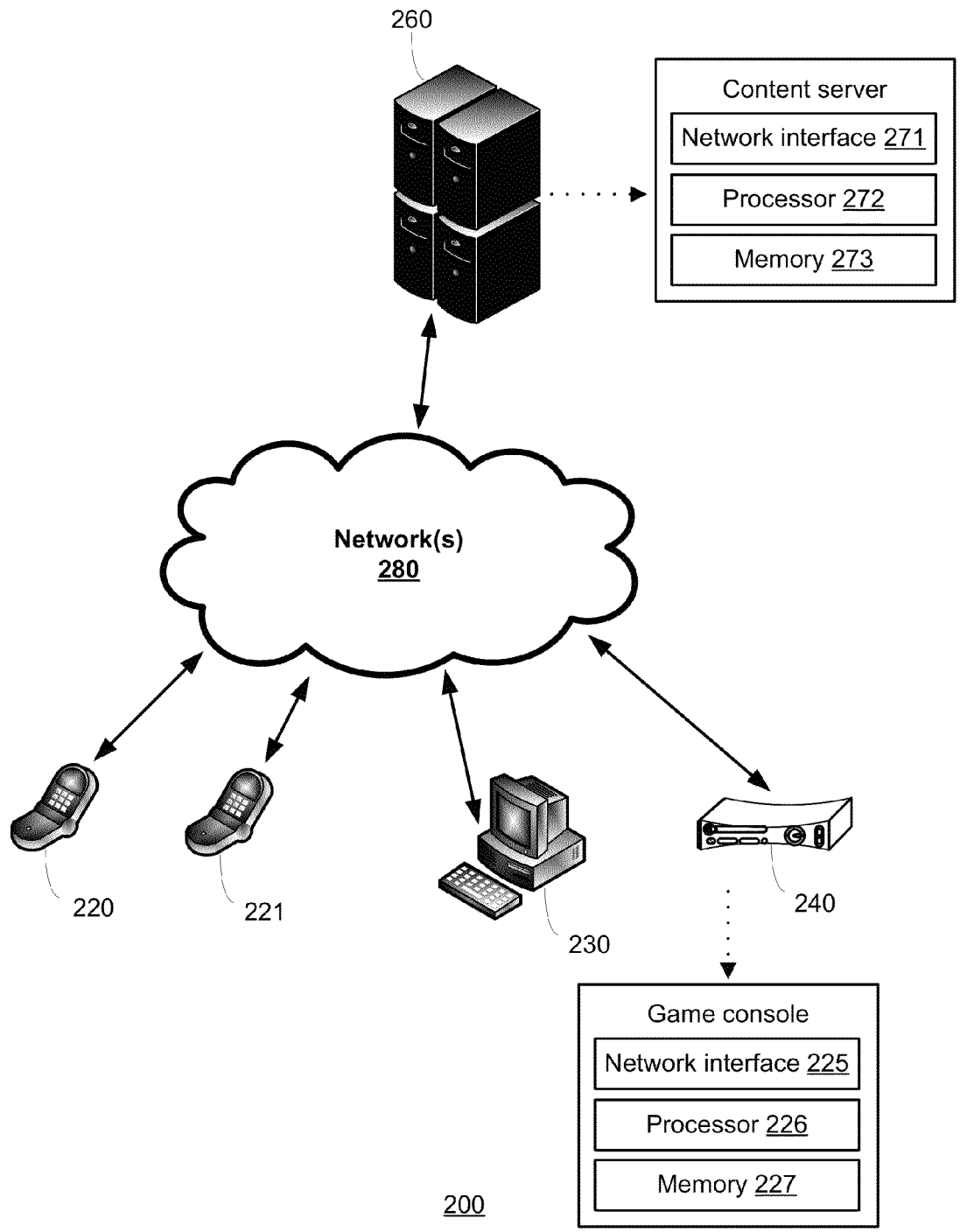
FIG. 1 is a block diagram of one embodiment of a networked computing environment.

FIG. 1 is a block diagram of one embodiment of a networked computing environment 200 in which the disclosed technology may be practiced. Networked computing environment 200 includes a plurality of computing devices interconnected through one or more networks 280. The one or more networks 280 allow a particular computing device to connect to and communicate with another computing device. The depicted computing devices include game console 240, mobile devices 220 and 221, desktop computer 230, and content server 260. In some embodiments, the plurality of computing devices may include other computing devices not shown. The one or more networks 280 may include a secure network such as an enterprise private network, an unsecure network such as a wireless open network, a local area network (LAN), a wide area network (WAN), and the Internet. Each network of the one or more networks 280 may include hubs, bridges, routers, switches, and wired transmission media such as a wired network or direct-wired connection.

A content server, such as content server 260, may allow a client to download content (e.g., audio, image, video, and gaming files) stored on the content server by responding to a client's request for particular content, and transferring the particular content to the client. One embodiment of content server 260 includes a network interface 271, processor 272, and memory 273, all in communication with each other. Network interface 271 allows content server 260 to connect to one or more networks 280. Network interface 271 may include a wireless network interface, a modem, and/or a wired network interface. Processor 272 allows content server 260 to execute computer readable instructions stored in memory 273 to perform the processes discussed herein.

In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of gaming console 240 includes a network interface 225, processor 226, and memory 227, all in communication with each other. Network interface 225 allows game console 240 to connect to one or more networks 280. Network interface 225 may include a wireless network interface, a modem, and/or a wired network interface. Processor 226 allows game console 240 to execute computer readable instructions stored in memory 227 to perform the processes discussed herein.

In one embodiment, one of the plurality of computing devices, game console 240, sends an HTTP request message to content server 260 for a particular resource. For example, game console 240 may request a new file, a new game, an update to a game, an update to system software, an image, a video, audio, etc. In response to receiving the HTTP request, content server 260 generates a content identifier and a content expiration time for the particular resource requested. In one embodiment, the content expiration time specifies the time at which the particular resource is no longer considered valid. The content expiration time may be specified according to a particular reference time, such as Greenwich Mean Time, or specified relative to a time field stored in an HTTP header (e.g., a cache expiration time). In one embodiment, the content identifier includes a Uniform Resource Name (URN) that uniquely identifies the particular resource.

After the content identifier and content expiration time have been generated, content server 260 generates a digital signature using the content identifier, content expiration time and the particular resource. In one example, content server 260 accesses signature generation software stored in memory 273 and executes the signature generation software on processor 272 in order to generate the digital signature. The content server 260 then embeds the content identifier, content expiration time, and digital signature in the HTTP header of an HTTP response message and sends the HTTP response message to game console 240. The digital signature embedded within the HTTP response message allows game console 240 to verify the true identity of the content server 260 and/or verify the authenticity of the particular resource received by game console 240. In one example, game console 240 accesses verification software stored in memory 227 and executes the verification software on processor 226 in order to verify the authenticity of the particular resource. Although the examples of the disclosed technology described herein may discuss the request and transmission of a resource or file, other data units may also be used.

Figure 2A:
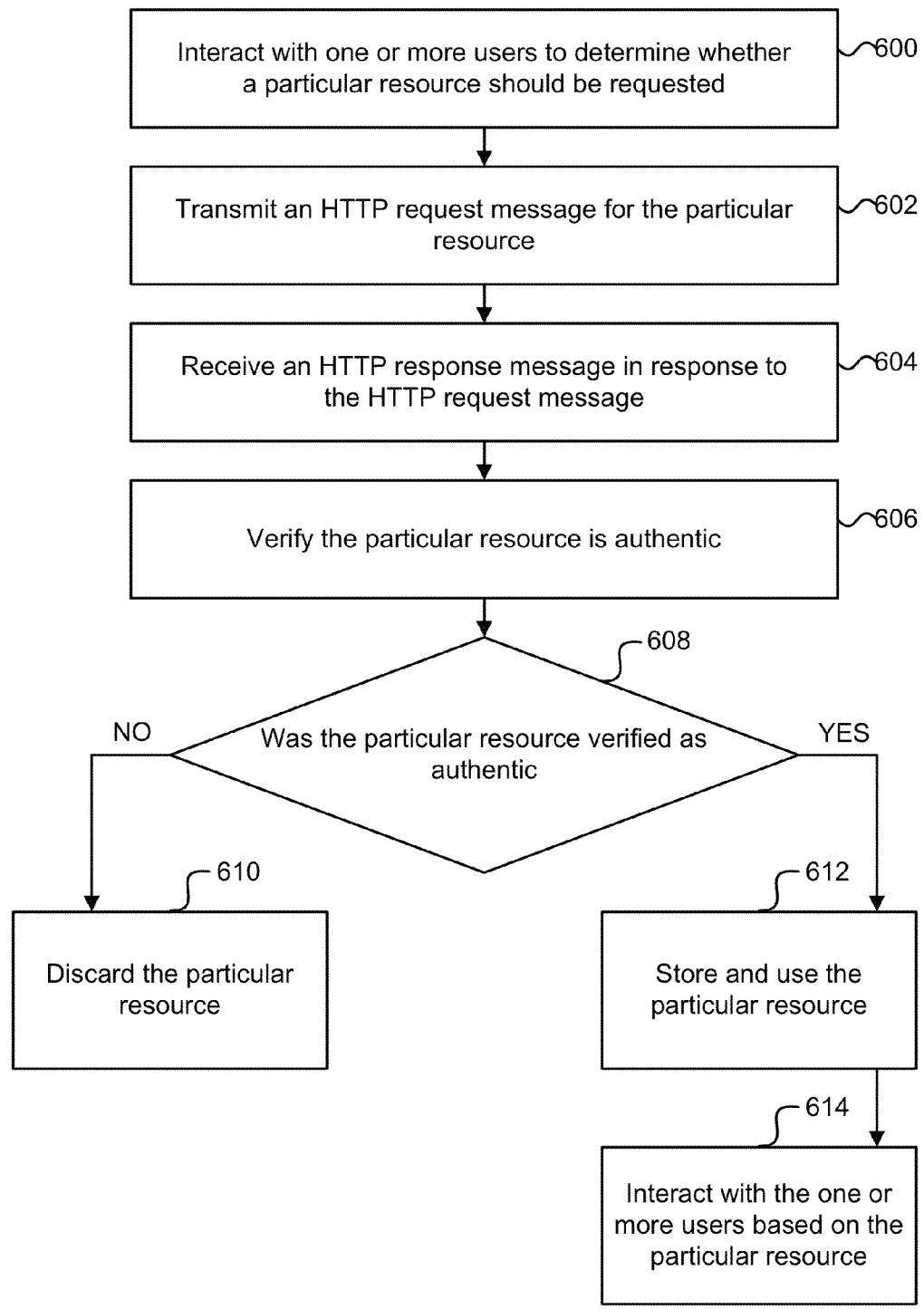
FIG. 2A is a flowchart describing one embodiment of a process for requesting and verifying a particular resource.

FIG. 2A is a flowchart describing one embodiment of a process for requesting and verifying the authenticity of a particular resource. The process of FIG. 2A may be performed by one or more computing devices. Each step in the process of FIG. 2A may be performed by the same or different computing devices as those used in other steps, and each step need not necessarily be performed by a single computing device. In one embodiment, the process of FIG. 2A is performed by a mobile device. In another embodiment, the process of FIG. 2A is performed by a game console.

In step 600, a computing device, such one of the plurality of computing devices depicted in FIG. 1, interacts with one or more users to determine whether a particular resource should be requested. In one example, a list of possible content downloads is displayed to the one or more users. In step 602, an HTTP request message for a particular resource is transmitted. In one example, game console 240 in FIG. 1 transmits an HTTP request for a particular game update. In step 604, an HTTP response message is received in response to the HTTP request message. The HTTP response message received may include an HTTP response header and the particular resource requested. In one embodiment, the HTTP response header includes a content identifier field, a content expiration field, and a digital signature. In step 606, the particular resource is authenticated in order to confirm that the particular resource is trusted content from a trusted source. In one example, game console 240 decrypts the digital signature associated with the HTTP response message and compares the decrypted digital signature with portions of the HTTP response message. In another example, game console 240 verifies that the content expiration time has not occurred.

In step 608, a determination is made as to whether or not the particular resource verified as authentic. If the particular resource is not determined to be authentic, then the particular resource is discarded in step 610. If the particular resource is determined to be authentic, then the particular resource is stored and used. In one example, the particular resource is stored in memory 227 of game console 240. In step 614, the computing device may interact with one or more uses based on the particular resource. In one example, the particular resource is a gaming update, and the one or more users may play a particular game including the gaming update.

Figure 2B:
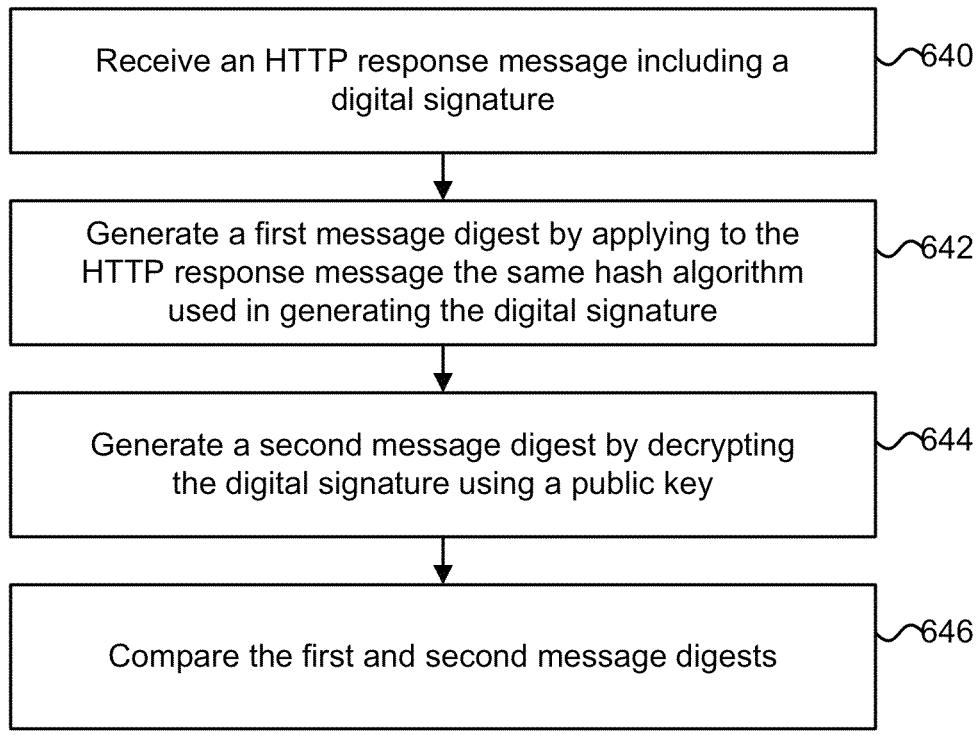
FIG. 2B is a flowchart describing one embodiment of a process for verifying the contents of an HTTP response message.

FIG. 2B is a flowchart describing one embodiment of a process for verifying the contents of an HTTP response message. The process described in FIG. 2B is only one example of a process for implementing step 606 in FIG. 2A. The process of FIG. 2B may be performed by one or more computing devices. Each step in the process of FIG. 2B may be performed by the same or different computing devices as those used in other steps, and each step need not necessarily be performed by a single computing device. In one embodiment, the process of FIG. 2B is performed by a mobile device. In another embodiment, the process of FIG. 2B is performed by a game console.

In order to authenticate the contents, such as a particular resource, included within the HTTP response message, a computing device, such as game console 240 in FIG. 1, generates the message digest used as the basis for creating a digital signature two different ways and compares the results. In step 640, an HTTP response message including a digital signature is received. In step 642, a first message digest is generated by applying to the HTTP response message the same hash algorithm used in generating the digital signature. In one example, the first message digest is generated by the computing device hashing the received "plaintext" message (i.e., the received message itself is not encrypted) including the content identifier, content expiration time, and the particular resource with the same hashing algorithm used by the content server, such as content server 260 in FIG. 1, from which the HTTP response message was ultimately received.

In step 644, a second message digest is generated by decrypting the digital signature using a public key. In one example, the second message digest is generated by the computing device decrypting the digital signature using the public key for the content server from which the HTTP response message was ultimately received. The computing device may acquire and/or certify the appropriate public key necessary to decrypt the digital signature using a trusted third party. For example, the computing device may obtain a digital certificate from a trusted certificate authority. The digital certificate may use the digital signature of the trusted certificate authority to bind together the public key of interest and the identity of the party responsible (e.g., a specific person or entity) for the content server. The computing device is able to verify that the digital certificate is itself valid if it is signed by the trusted certificate authority.

In step 646, the first and second message digests are compared. If the two message digests match, then the particular resource included within the HTTP response message is verified to be authentic.

In one embodiment, a digital signature contained within an HTTP response message is generated using a private key belonging to content server 260 in FIG. 1. Subsequently, game console 240 in FIG. 1 uses a corresponding public key certified by a trusted third party to authenticate the contents of the HTTP response message. In one embodiment, the corresponding public key is acquired from the HTTP response message itself. In one example, the corresponding public key is placed into a supplemental header within the HTTP response message header. A supplemental header is a non-standard HTTP header. In another embodiment, the corresponding public key is stored in memory 227 in FIG. 1 prior to receipt of the HTTP response message. In one example, one or more public keys are placed into memory 227 prior to customer shipment. In another embodiment, the public key is obtained from the trusted third party or another entity.

FIG. 3 depicts one embodiment of an HTTP request message and an associated HTTP response message. HTTP request message 402, which is one example of an HTTP request transmitted in step 602 of FIG. 2A, includes an HTTP header with the HTTP method "GET," the Universal Resource Identifier "/path/gamename.html," and the HTTP protocol version. The header "Connection" is a standard HTTP header. In this case, there is no message body as only HTTP-Post requests contain both a message header and message body. HTTP request message 402 requests the file "/path/gamename.html" from the server associated with the URL "www.gameserver.com."

HTTP response message 404 is one example of an HTTP response message received in step 604 of FIG. 2A. The first line of HTTP response message 404 indicates the protocol version and a status line, such as "OK," which indicates success of the request, several standard headers (e.g., Content-Length), several supplemental headers (e.g., X-HTTPSig-Urn), and an HTTP message body. The HTTP message body may also be referred to as the HTTP body or payload. Lines 2-9 (i.e., from Age: 30 to Server: Brussels) of the HTTP response message 404 include standard HTTP headers. Lines 10-12 of the HTTP response message 404 include non-standard supplemental headers (i.e., X-HTTPSig-Expires, X-HTTPSig-Urn, and X-HTTPSig-Signature). Each HTTP header may include supplemental headers not defined in the HTTP protocol as long as the supplemental headers do not conflict with existing applications using the HTTP protocol. This means that an application which processes HTTP messages, and for which is not configured to handle certain supplemental headers, will simply ignore the supplemental headers without interrupting its execution. One convention for non-standard supplemental headers is to prefix the particular header name with an "X" (e.g., X-HTTPSig-Urn).

In one embodiment, the HTTP header for response message 404 includes three supplemental headers. The first, X-HTTPSig-Expires, specifies the time at which the HTTP message body is no longer considered valid and includes the content expiration time discussed above. The second, X-HTTPSig-Urn, associates the HTTP message body with a specific Uniform Resource Name (URN) and/or a particular name or namespace and includes the content identifier discussed above. The third supplemental header, X-HTTPSig-Signature, includes the digital signature discussed above. In one example, the X-HTTPSig-Signature header contains a digital signature that has been BASE64 encoded. In one embodiment, the X-HTTPSig-Signature header contains a digital signature that is generated using the HTTP message body and at least one of the other supplemental headers (e.g., X-HTTPSig-Expires and X-HTTPSig-Urn).

In one embodiment, the header fields used to create the message digest (i.e., the parts of the HTTP response message used in generating the digital signature) are customized depending on the type of data being transmitted. For example, in cases where content is more likely to be forged and/or tampered with, the header fields used to create the message digest may include both X-HTTPSig-Expires and X-HTTPSig-Urn rather than only one header field. In one example, content server 260 in FIG. 1 determines the header fields to use in creating a message digest by accessing a lookup table stored in memory 273.

In one embodiment, a content server places the header fields used in generating a particular digital signature inside a response message. In one example, the header fields ultimately used in creating a message digest may be communicated from a content server, such as content server 260 in FIG. 1, to a client, such as game console 240 in FIG. 1, as supplemental header entries in an HTTP response header. In another embodiment, the fields used in generating the digital signature are not transmitted to game console 240 directly from content server 260, but instead, are stored in memory 227 in FIG. 1 prior to customer shipment. In another example, information regarding the parts of the HTTP response message used in generating the digital signature is downloaded separately from the HTTP response message and stored in memory 227 in FIG. 1.

Figure 4B:
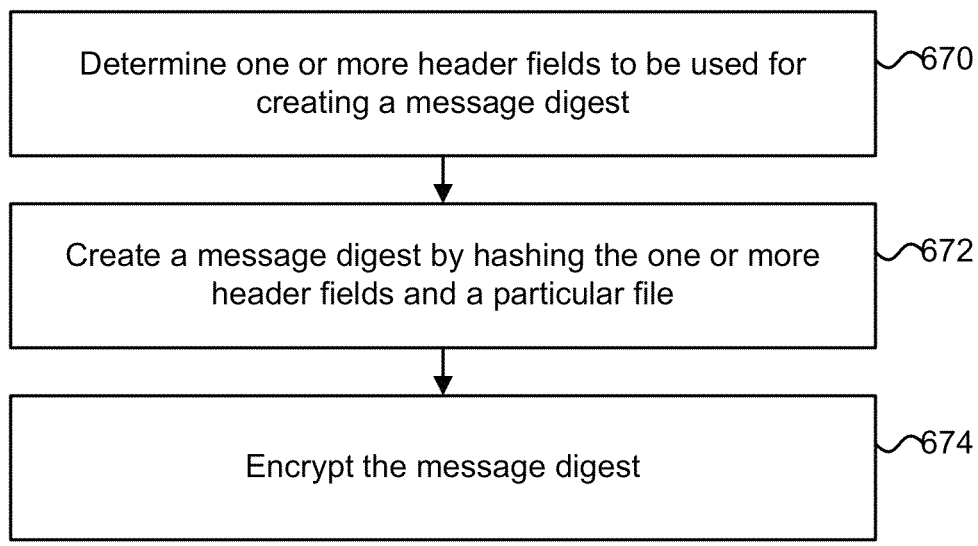
FIG. 4B is a flowchart describing one embodiment of a process for generating a digital signature.
Figure 4A:
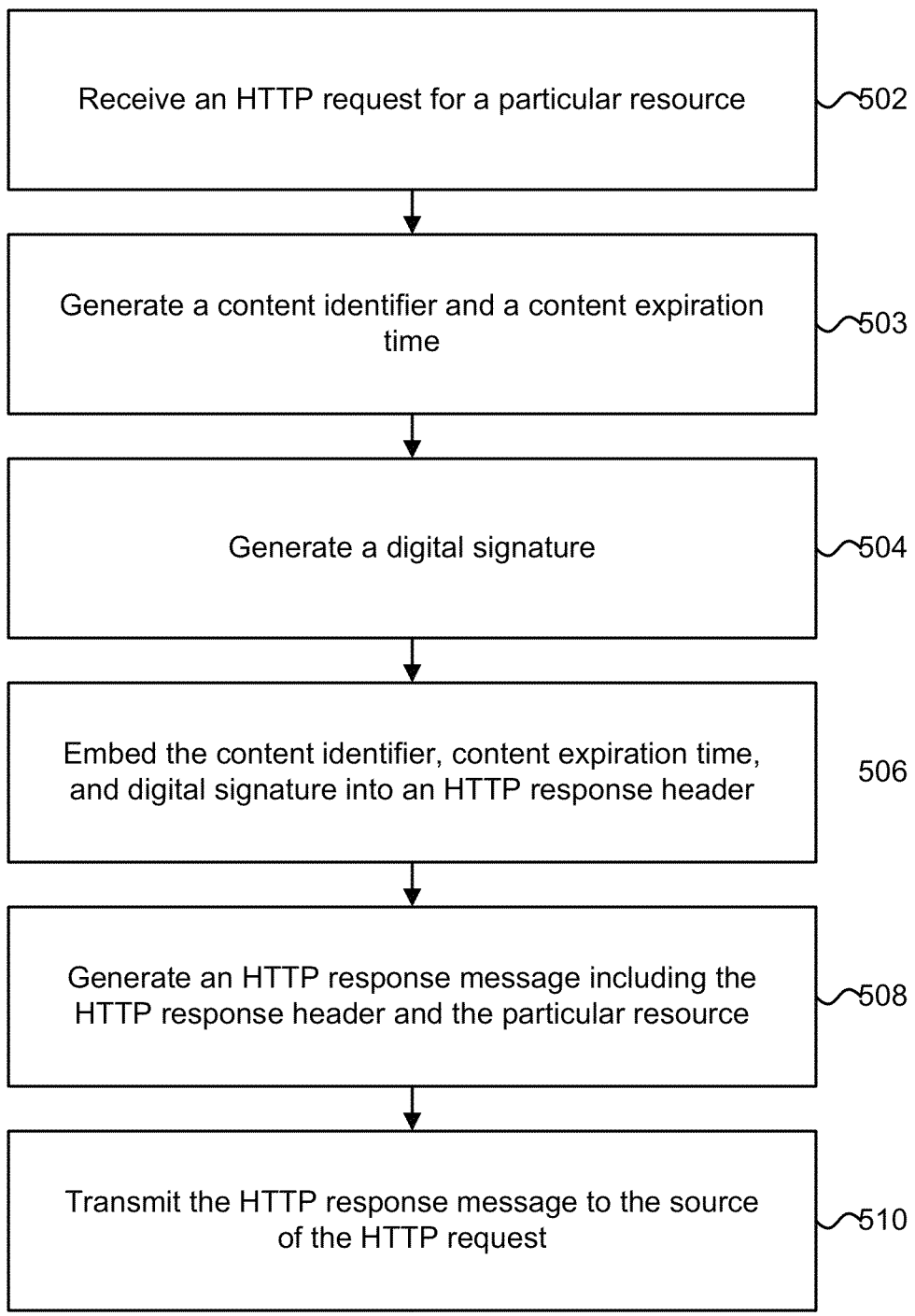
FIG. 4A is a flowchart describing one embodiment of a process for signing an HTTP response message.

FIG. 4A is a flowchart describing one embodiment of a process for signing an HTTP response message. The process of FIG. 4A may be performed by one or more computing devices. Each step in the process of FIG. 4A may be performed by the same or different computing devices as those used in other steps, and each step need not necessarily be performed by a single computing device. In one embodiment, the process of FIG. 4A is performed by a content server.

In step 502, an HTTP request for a particular resource is received. One example of an HTTP request message is HTTP request message 402 depicted in FIG. 3. In step 503, a content identifier and a content expiration time are generated for the particular resource. In step 504, a digital signature is generated for the particular resource. In one embodiment, the digital signature is generated from the content identifier, content expiration time, and the particular resource. In another embodiment, the digital signature is generated from the particular resource and at least one of the content identifier and the content expiration time. In step 506, the content identifier, the content expiration time, and the digital signature are embedded into an HTTP response header. In one embodiment, the content identifier, content expiration time, and digital signature are placed into supplemental headers within the HTTP response header. A supplemental header is a non-standard HTTP header. An application which processes HTTP messages, and for which is not configured to handle the supplemental header, will typically ignore the supplemental header without interrupting its execution. In step 508, an HTTP response message is generated including the HTTP response header and the particular resource. One example of an HTTP response message is HTTP response message 404 depicted in FIG. 3. In step 510, the HTTP response message is transmitted to the source of the HTTP request. In one example, the HTTP response message is transmitted to the client that requested the particular resource.

In one embodiment, the content expiration time specifies the time at which a particular resource, or portion thereof, is no longer considered valid. The content expiration time may be specified according to a particular reference time, such as Greenwich Mean Time, or specified relative to a time field stored in an HTTP header (e.g., a cache expiration time). In one embodiment, the content identifier includes a Uniform Resource Name (URN) that uniquely identifies the resource.

In one embodiment, the content expiration time is specified relative to a time field stored in an HTTP header. In one example, the content expiration time is specified relative to the cache expiration time. Specifying a relative time allows for time drift compensation between a client and server due to network latency, clock inaccuracies, and other factors. In one example, the cache expiration time is set to 30 minutes and the content expiration time is set to 2 minutes after the cache expiration time. In another embodiment, in order to compensate for time drift between a client and server, the client may allow for a window of time beyond which the content expiration time is considered valid. For example, a client may receive an HTTP response with a content expiration time that has already passed; however, the client may still consider the contents of the HTTP response to be valid as long as it was received within as given window of time (e.g., 2 hours).

FIG. 4B is a flowchart describing one embodiment of a process for generating a digital signature. The process described in FIG. 4B is only one example of a process for implementing step 504 in FIG. 4A. The process of FIG. 4B may be performed by one or more computing devices. Each step in the process of FIG. 4B may be performed by the same or different computing devices as those used in other steps, and each step need not necessarily be performed by a single computing device. In one embodiment, the process of FIG. 4B is performed by a signing proxy server. In another embodiment, the process of FIG. 4B is performed by a content server.

Digital signatures are commonly generated using public key cryptography (i.e., asymmetric cryptographic algorithms). In step 670, one or more header fields to be used for creating a message digest are determined. In step 672, a message digest is created by hashing the one or more header fields and a particular resource. In one example, the one or more header fields and the particular resource are concatenated prior to hashing. Because public key encryption is very processing intensive, it can only be used on relatively small blocks of information. To reduce a large amount of information into something smaller and more manageable, a computing device, such as content server 260 in FIG. 1, may hash the parts of the HTTP response message to be signed prior to signing. In one example, content server 260 in FIG. 1 applies the MD5 hashing algorithm to the parts of the HTTP response message to be signed in order to produce a hash of 128 bits. In another example, content server 260 in FIG. 1 applies the SHA-1 hashing algorithm to the parts of the HTTP response message to be signed in order to produce a hash of 160 bits. The hash of the parts of the HTTP response message to be signed (e.g., the content identifier, the content expiration time, and/or the particular resource) is called the message digest. The message digest is not the digital signature itself, but rather the basis for creating the digital signature. Once a message digest is created, content server 260 may subsequently generate a digital signature by signing the message digest with a private key (i.e., by encrypting the message digest with a private key). In step 674, the message digest is encrypted to generate a digital signature.

Figure 5:
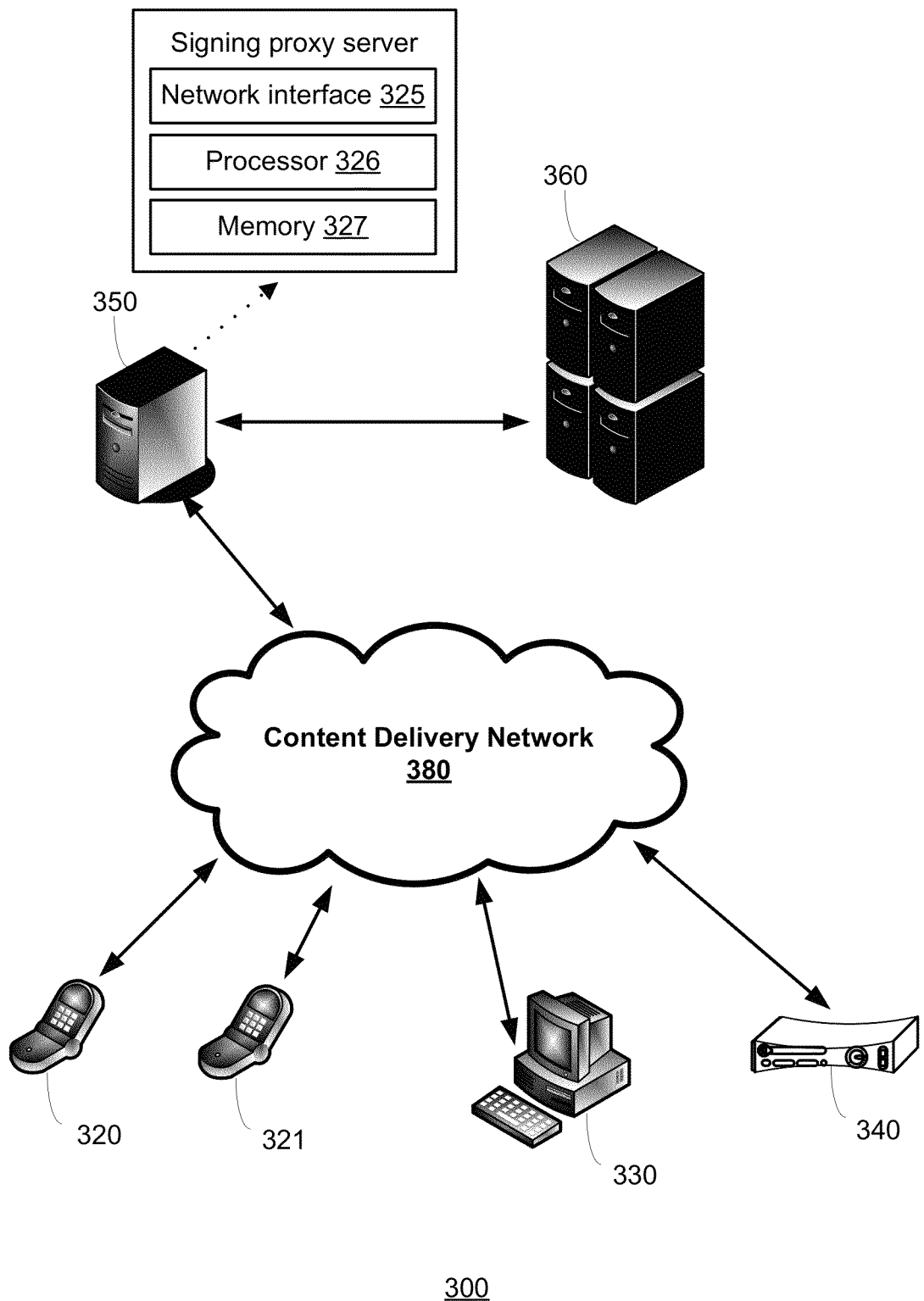
FIG. 5 is a block diagram of one embodiment of a networked computing environment including a content delivery network and a signing proxy server.

FIG. 5 is a block diagram of one embodiment of a networked computing environment 300 including a content delivery network 380. Networked computing environment 300 includes a plurality of client devices connected to a content delivery network (CDN) 380. The depicted client devices include mobile devices 320 and 321, desktop computer 330, and gaming console 340. CDN 380 is connected to a signing proxy server 350. In one embodiment, the client devices may operate according to the processes described with respect to FIGS. 2A-2B. Signing proxy server is connected to origin server 360 via a network (e.g., the Internet). The origin server 360 is the origin for original resources (e.g., files, documents, or executables); in contrast to a cache or proxy server which contains copies of an original file. The networked computing environment 300 allows a particular client device to download content, originating from origin server 360, from CDN 380 without having to connect with the origin server 360 directly. In one embodiment, origin server 360 transfers a file to a signing proxy server 350 that subsequently signs and transmits the signed file to CDN 380.

One embodiment of signing proxy server 350 includes a network interface 325, processor 326, and memory 327, all in communication with each other. Network interface 325 allows signing proxy server 350 to connect to content delivery network 380. Network interface 271 may include a wireless network interface, a modem, and/or a wired network interface. Processor 326 allows signing proxy server 350 to execute computer readable instructions stored in memory 327 to perform the processes discussed herein.

Proxy servers acting on behalf of origin server 360 may be used to improve network performance (e.g., acting as a caching proxy server) and/or provide enhanced security. However, authentication may be problematic when the path between a client and an origin server includes a proxy, such as signing proxy server 350, or other intermediate computing device. A common technique for enabling a secure connection over the Internet (e.g., a secure connection during online shopping or banking) is to use the Secure Socket Layer (SSL) protocol. The SSL protocol initially uses a public key-private key pair encryption system for authentication. Thereafter, the SSL transmissions involve sending content encrypted using a symmetric session key, where both the client and server use the same session key to encrypt and decrypt content. Symmetric key encryption may be used (rather than public key encryption) because the composite message containing the file to be sent and the digital signature may be long. As noted earlier, public key encryption is not feasible for long messages. In contrast, symmetric key encryption is more efficient for longer messages. In one embodiment, signing proxy server 350 establishes a secure connection with origin server 360 via SSL prior to transferring a particular file.

In one embodiment, content delivery network 380 provides efficient access to a virtual marketplace for games and other media files for execution on a game console. For example, end users of a particular game console may preview and download purchased or promotional content including, but not limited to, videos and games, movie and game trailers, game updates, game demos, game maps, and game related pictures. In one embodiment, a computing device requests a particular game update and receives the particular game update directly from CDN 380 without requiring any communication with the origin server 360. In another embodiment, a computing device requests live data and receives the live data directly from CDN 380 without requiring any communication with the origin server 360. The live data may include live schedule data (e.g., for upcoming games) and/or live scores data.

In one embodiment, signing proxy server 350 determines how to create a particular message digest, creates the message digest, and embeds the header fields necessary to generate the message digest in a supplemental header. In this case, the origin server 360 may be a third party origin server from which the complexity and implementation details for generating digital signatures, and other authentication procedures, are hidden.

In one embodiment, signing proxy server 350 receives content and an associated header to be delivered to content delivery network 380. Subsequently, signing proxy server 350 generates a digital signature by creating a hash value using a subset of the headers fields within the associated header, accessing a private key stored in memory 327, and executing software on processor 326 for encrypting the hash value. After the digital signature is generated, an HTTP message including an HTTP header and the content to be delivered is created. In one embodiment, the HTTP header includes the digital signature and the subset of the header fields used in generating the digital signature. In another embodiment, a public key or digital certificate containing a public key are also included in the HTTP header.

There are several ways to communicate which header fields were used to generate a digital signature along with particular content. In one embodiment, the header fields used to generate a particular message digest are all associated with a particular prefix identifier (e.g., X-HTTPSig). In this case, a client, such as game console 340, receiving an HTTP response message uses all supplemental headers including the string "X-HTTPSig" to recreate the message digest. In another embodiment, instead of using all supplemental headers including the string "X-HTTPSig" to recreate the message digest, a particular supplemental header itself may specify which header fields were used. In one example, a client receiving an HTTP response message uses only those supplemental headers listed in the particular supplemental header "X-HTTPSig-DigestHeaders."

Figure 6:
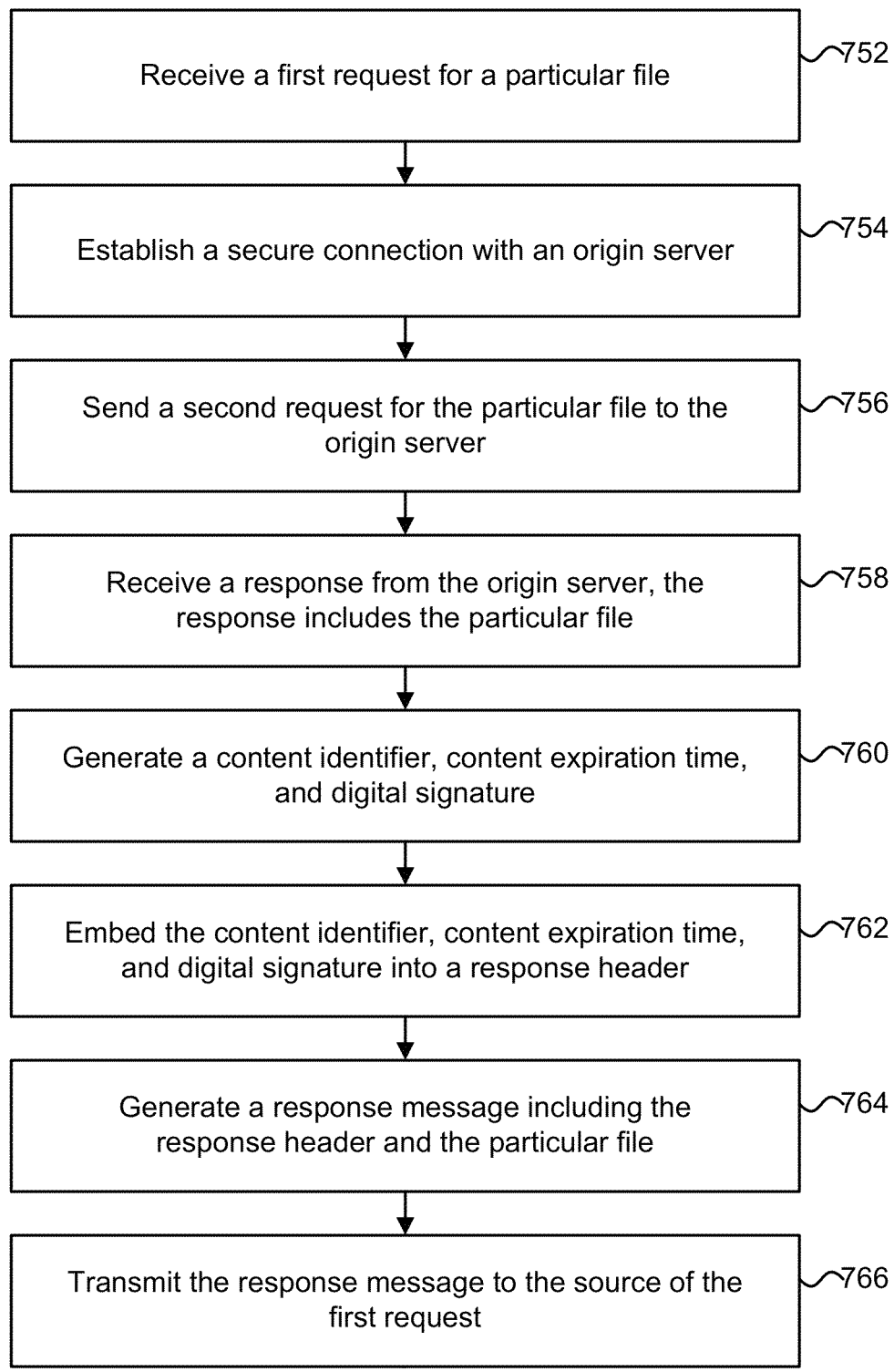
FIG. 6 is a flowchart describing one embodiment of a process for signing a response message.

FIG. 6 is a flowchart describing one embodiment of a process for signing a response message. The process of FIG. 6 may be performed by one or more computing devices. Each step in the process of FIG. 6 may be performed by the same or different computing devices as those used in other steps, and each step need not necessarily be performed by a single computing device. In one embodiment, the process of FIG. 6 is performed by a signing proxy server.

In step 752, a first request for a particular file is received. In one embodiment, the HTTP request is received by a proxy server such as signing proxy server 350. In one example, the first request is for a particular game update. In step 754, a secure connection with an origin server is established. In one embodiment, signing proxy server 350 in FIG. 5 establishes a secure connection via SSL with origin server 360 in FIG. 5. In step 756, a second request for the particular file is sent to the origin server. In step 758, a response from the origin server to the second request is received including a header and the particular file. In one example, the header includes a content identifier field, a content expiration field, and a digital signature. In step 760, a content identifier, a content expiration time, and a digital signature are generated for the particular file. The process described in FIG. 4B provides one example of a process for implementing step 760. In one embodiment, the digital signature is generated from the content identifier, content expiration time, and the particular file. In another embodiment, the digital signature is generated from the particular file and at least one of the content identifier and the content expiration time.

In step 762, the content identifier, the content expiration time, and the digital signature are embedded into a response header. In one embodiment, the content identifier, content expiration time, and digital signature are placed into supplemental headers within an HTTP response header. In step 764, a response message is generated including the response header and the particular file. One example of a response message is HTTP response message 404 depicted in FIG. 3. In step 766, the response message is transmitted to the source of the first request. In one example, the response message is transmitted to the client that requested the particular file. In another example, the response message is transmitted to a content delivery network.

The disclosed technology may be used with various computing systems. FIGS. 7-10 provide examples of various computing systems that can be used to implement embodiments of the disclosed technology.

Figure 7:
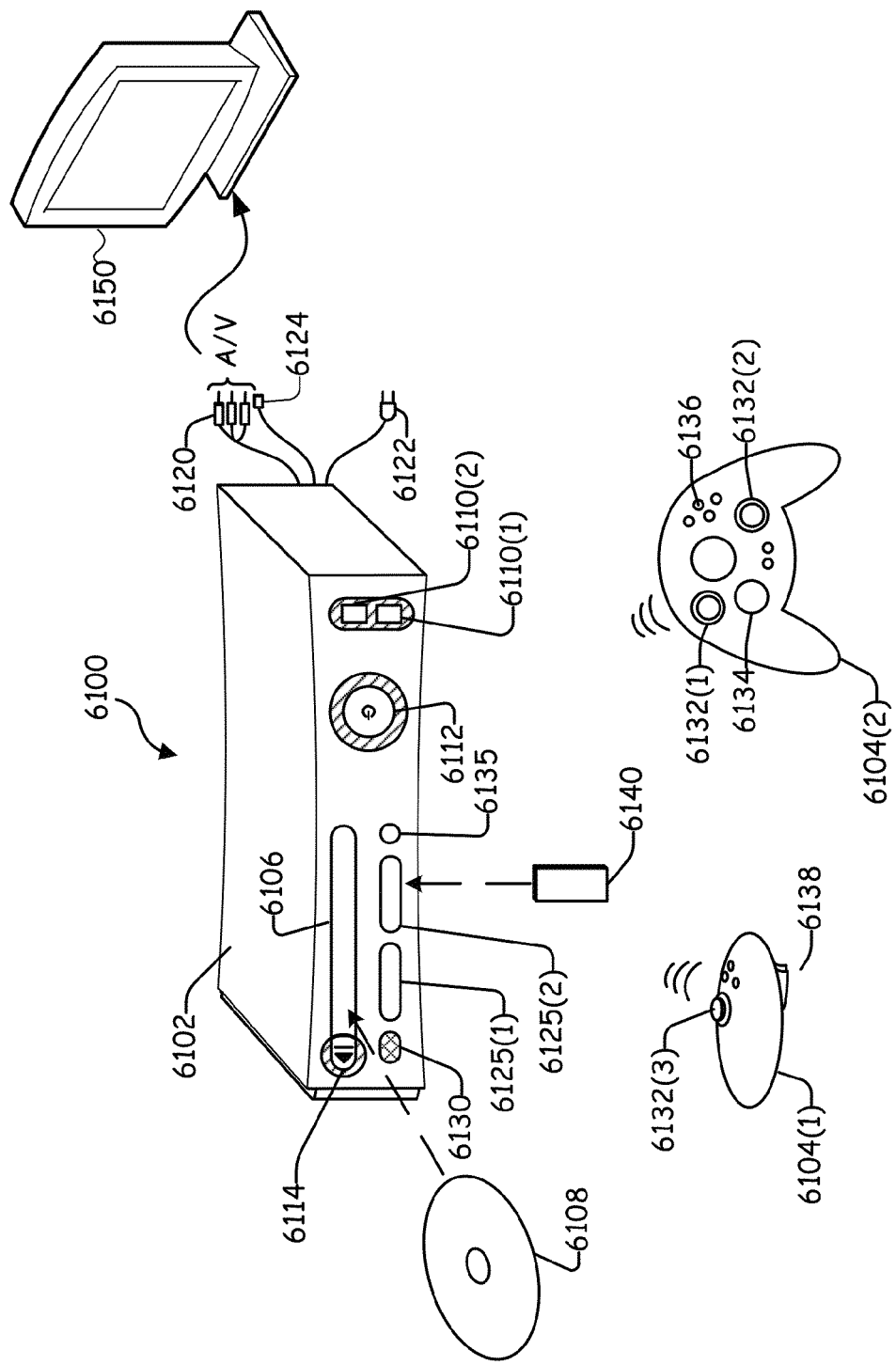
FIG. 7 depicts one embodiment of a gaming and media system.

FIG. 7 depicts one embodiment of a gaming and media system 6100. The following discussion of FIG. 7 is intended to provide a brief, general description of a suitable environment in which the concepts presented herein may be implemented. For example, the apparatus of FIG. 7 is one example of game console 240 in FIG. 1 or game console 340 in FIG. 5. As shown in FIG. 7, gaming and media system 6100 includes a game and media console (hereinafter "console") 6102. In general, console 6102 is one type of computing system, as will be further described below. Console 6102 is configured to accommodate one or more wireless controllers, as represented by controllers 6104(1) and 6104(2). Console 6102 is equipped with an internal hard disk drive (not shown) and a portable media drive 6106 that support various forms of portable storage media, as represented by optical storage disc 6108. Examples of suitable portable storage media include DVD, CD-ROM, and game discs. Console 6102 also includes two memory unit card receptacles 6125(1) and 6125(2), for receiving removable flash-type memory units 6140. A command button 6135 on console 6102 enables and disables wireless peripheral support.

As depicted in FIG. 7, console 6102 also includes an optical port 6130 for communicating wirelessly with one or more devices and two USB (Universal Serial Bus) ports 6110(1) and 6110(2) to support a wired connection for additional controllers, or other peripherals. In some implementations, the number and arrangement of additional ports may be modified. A power button 6112 and an eject button 6114 are also positioned on the front face of game console 6102. Power button 6112 is selected to apply power to the game console, and can also provide access to other features and controls, and eject button 6114 alternately opens and closes the tray of a portable media drive 6106 to enable insertion and extraction of a storage disc 6108.

Console 6102 connects to a television or other display (such as monitor 6150) via A/V interfacing cables 6120. In one implementation, console 6102 is equipped with a dedicated A/V port (not shown) configured for content-secured digital communication using A/V cables 6120 (e.g., A/V cables suitable for coupling to a High Definition Multimedia Interface "HDMI" port on a high definition monitor 6150 or other display device). A power cable 6122 provides power to the game console. Console 6102 may be further configured with broadband capabilities, as represented by a cable or modem connector 6124 to facilitate access to a network, such as the Internet. The broadband capabilities can also be provided wirelessly, through a broadband network such as a wireless fidelity (Wi-Fi) network.

Each controller 6104 is coupled to console 6102 via a wired or wireless interface. In the illustrated implementation, the controllers 6104(1) and 6104(2) are USB-compatible and are coupled to console 6102 via a wireless or USB port 6110. Console 6102 may be equipped with any of a wide variety of user interaction mechanisms. For example, in FIG. 7, controller 6104(2) is equipped with two thumbsticks 6132(1) and 6132(2), a D-pad 6134, and buttons 6136, and controller 6104(1) is equipped with thumbstick 6132(3) and triggers 6138. These controllers are merely representative, and other known gaming controllers may be substituted for, or added to, those shown in FIG. 7.

In one implementation, a memory unit (MU) 6140 may be inserted into controller 6104(2) to provide additional and portable storage. Portable MUs enable users to store game parameters for use when playing on other consoles. In one embodiment, each controller is configured to accommodate two Mus 6140, although more or less than two MUs may also be employed. In another embodiment, a Universal Serial Bus (USB) flash memory storage may also be inserted into controller 6104(2) to provide additional and portable storage.

Gaming and media system 6100 is generally configured for playing games stored on a memory medium, as well as for downloading and playing games, and reproducing pre-recorded music and videos, from both electronic and hard media sources. With the different storage offerings, titles can be played from the hard disk drive, from an optical disk media (e.g., 6108), from an online source, or from MU 6140.

During operation, console 6102 is configured to receive input from controllers 6104(1) and 6104(2) and display information on display 6150. For example, console 6102 can display a user interface on display 6150 to allow a user to perform the operations of the disclosed technology discussed herein.

Figure 8:
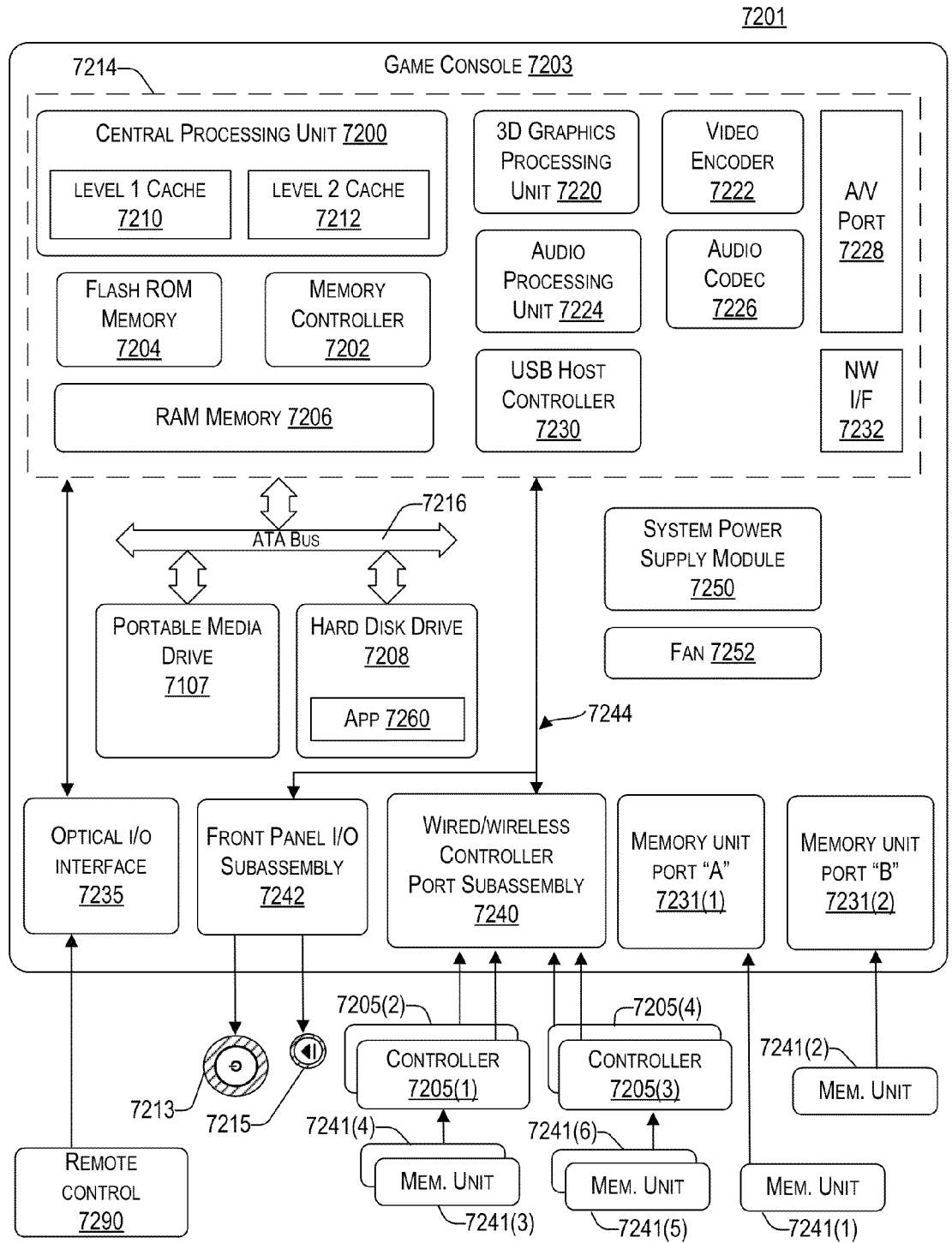
FIG. 8 is a block diagram of an embodiment of a gaming and media system.

FIG. 8 is a block diagram of an embodiment of a gaming and media system 7201 (such as system 6100). Console 7203 has a central processing unit (CPU) 7200, and a memory controller 7202 that facilitates processor access to various types of memory, including a flash Read Only Memory (ROM) 7204, a Random Access Memory (RAM) 7206, a hard disk drive 7208, and portable media drive 7107. In one implementation, CPU 7200 includes a level 1 cache 7210 and a level 2 cache 7212, to temporarily store data and hence reduce the number of memory access cycles made to the hard drive 7208, thereby improving processing speed and throughput.

CPU 7200, memory controller 7202, and various memory devices are interconnected via one or more buses (not shown). The one or more buses might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

In one implementation, CPU 7200, memory controller 7202, ROM 7204, and RAM 7206 are integrated onto a common module 7214. In this implementation, ROM 7204 is configured as a flash ROM that is connected to memory controller 7202 via a PCI bus and a ROM bus (neither of which are shown). RAM 7206 is configured as multiple Double Data Rate Synchronous Dynamic RAM (DDR SDRAM) modules that are independently controlled by memory controller 7202 via separate buses (not shown). Hard disk drive 7208 and portable media drive 7107 are shown connected to the memory controller 7202 via the PCI bus and an AT Attachment (ATA) bus 7216. However, in other implementations, dedicated data bus structures of different types may also be applied in the alternative.

A three-dimensional graphics processing unit 7220 and a video encoder 7222 form a video processing pipeline for high speed and high resolution (e.g., High Definition) graphics processing. Data are carried from graphics processing unit 7220 to video encoder 7222 via a digital video bus (not shown). An audio processing unit 7224 and an audio codec (coder/decoder) 7226 form a corresponding audio processing pipeline for multi-channel audio processing of various digital audio formats. Audio data are carried between audio processing unit 7224 and audio codec 7226 via a communication link (not shown). The video and audio processing pipelines output data to an A/V (audio/video) port 7228 for transmission to a television or other display. In the illustrated implementation, video and audio processing components 7220-7228 are mounted on module 7214.

FIG. 8 shows module 7214 including a USB host controller 7230 and a network interface 7232. USB host controller 7230 is in communication with CPU 7200 and memory controller 7202 via a bus (not shown) and serves as host for peripheral controllers 7205(1)-7205(4). Network interface 7232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 8, console 7203 includes a controller support subassembly 7240 for supporting four controllers 7205(1)-7205(4). The controller support subassembly 7240 includes any hardware and software components needed to support wired and wireless operation with an external control device, such as for example, a media and game controller. A front panel I/O subassembly 7242 supports the multiple functionalities of power button 7213, the eject button 7215, as well as any LEDs (light emitting diodes) or other indicators exposed on the outer surface of console 7203. Subassemblies 7240 and 7242 are in communication with module 7214 via one or more cable assemblies 7244. In other implementations, console 7203 can include additional controller subassemblies. The illustrated implementation also shows an optical I/O interface 7235 that is configured to send and receive signals (e.g., from remote control 7290) that can be communicated to module 7214.

MUs 7241(1) and 7241(2) are illustrated as being connectable to MU ports "A" 7231(1) and "B" 7231(2) respectively. Additional MUs (e.g., MUs 7241(3)-7241(6)) are illustrated as being connectable to controllers 7205(1) and 7205(3), i.e., two MUs for each controller. Controllers 7205(2) and 7205(4) can also be configured to receive MUs (not shown). Each MU 7241 offers additional storage on which games, game parameters, and other data may be stored. Additional memory devices, such as portable USB devices, can be used in place of the MUs. In some implementations, the other data can include any of a digital game component, an executable gaming application, an instruction set for expanding a gaming application, and a media file. When inserted into console 7203 or a controller, MU 7241 can be accessed by memory controller 7202. A system power supply module 7250 provides power to the components of gaming system 7201. A fan 7252 cools the circuitry within console 7203.

An application 7260 comprising machine instructions is stored on hard disk drive 7208. When console 7203 is powered on, various portions of application 7260 are loaded into RAM 7206, and/or caches 7210 and 7212, for execution on CPU 7200. Other applications may also be stored on hard disk drive 7208 for execution on CPU 7200.

Gaming and media system 7201 may be operated as a standalone system by simply connecting the system to a monitor, a television, a video projector, or other display device. In this standalone mode, gaming and media system 7201 enables one or more players to play games or enjoy digital media (e.g., by watching movies or listening to music). However, with the integration of broadband connectivity made available through network interface 7232, gaming and media system 7201 may further be operated as a participant in a larger network gaming community.

Figure 9:
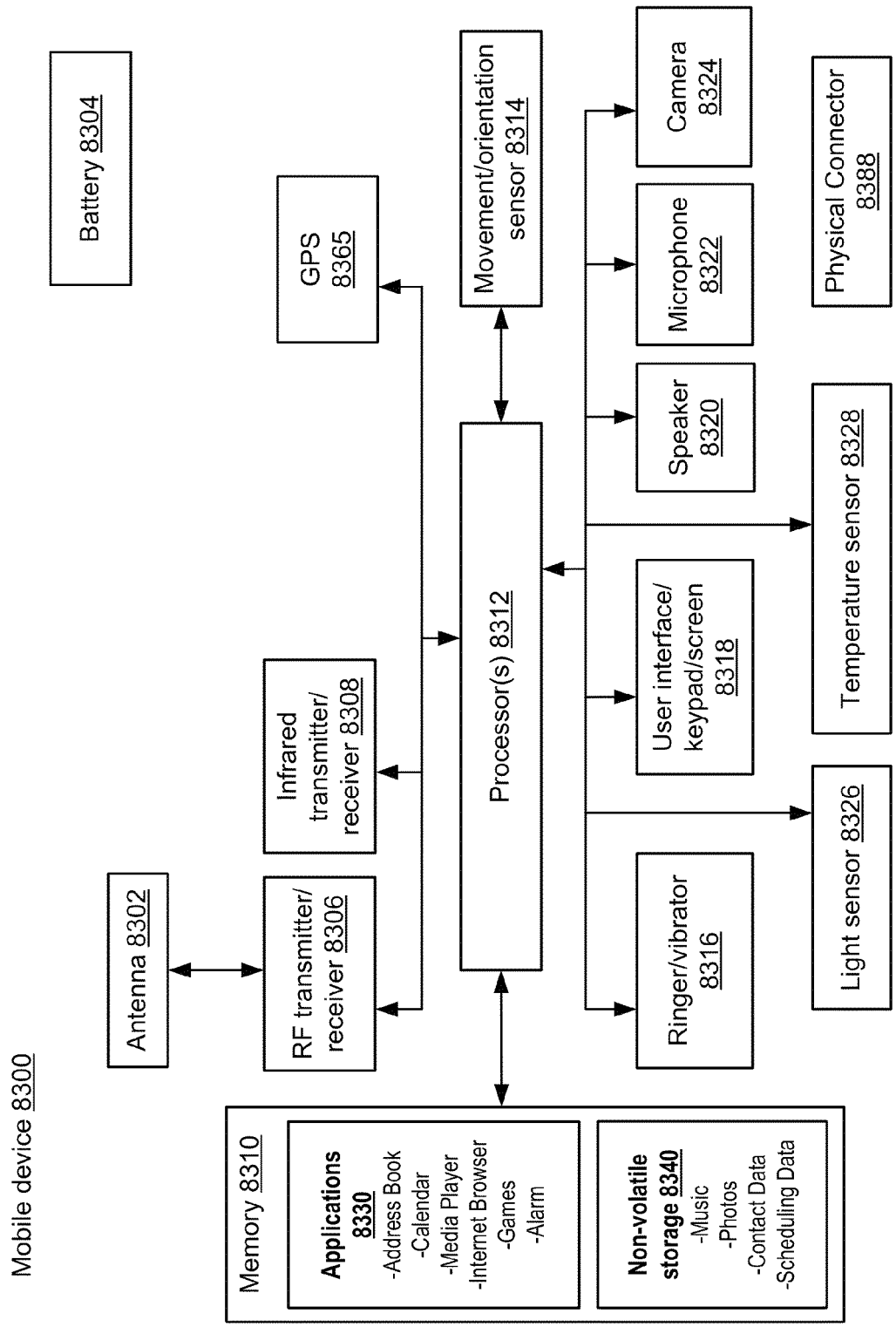
FIG. 9 is a block diagram of an embodiment of a mobile device.

FIG. 9 is a block diagram of one embodiment of a mobile device 8300. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

Figure 10:
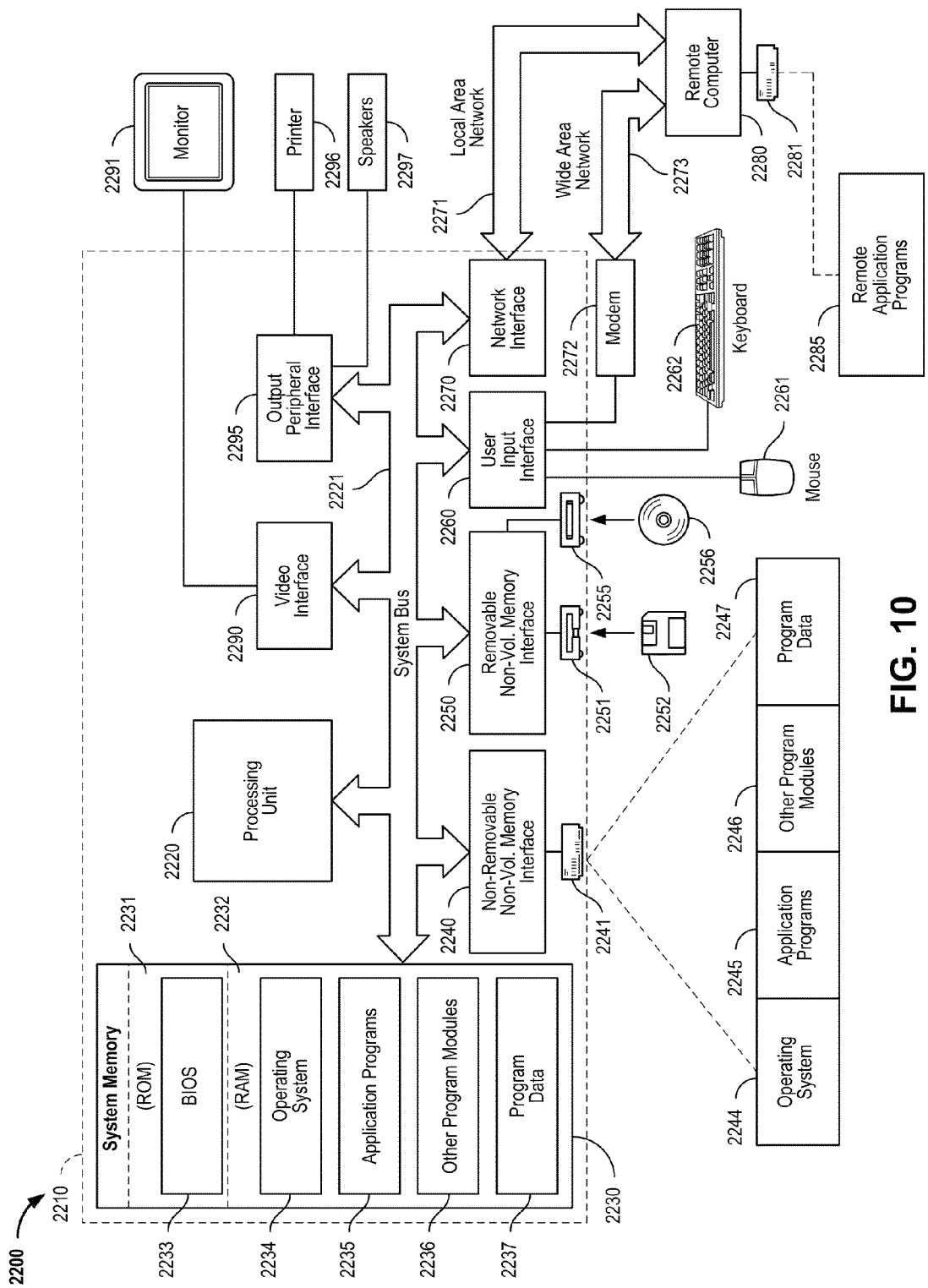
FIG. 10 is a block diagram of an embodiment of a computing system environment.

FIG. 10 is a block diagram of an embodiment of a computing system environment 2200. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 10 illustrates operating system 2234, application programs 2235, other program modules 2236, and program data 2237.

The computer 2210 may also include other removable/non-removable, volatile/nonvolatile computer storage media. By way of example only, FIG. 10 illustrates a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 10, provide storage of computer readable instructions, data structures, program modules and other data for the computer 2210. In FIG. 10, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 10. The logical connections depicted in FIG. 10 include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 10 illustrates remote application programs 2285 as residing on memory device 2281. It will be appreciated that the network connections shown are exemplary and other means of establishing a communications link between the computers may be used.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for signing data transferred over a network, comprising:
   receiving a request for a first resource;
   generating a first header field of a set of header fields, the first header field associated with a content identifier for the first resource;
   generating a second header field of the set of header fields, the second header field associated with a content expiration time for the first resource;
   determining a plurality of header fields corresponding with a message digest, the plurality of header fields includes at least one of the first header field or the second header field;
   generating the message digest, the generating the message digest includes hashing the plurality of header fields and at least a portion of the first resource;
   generating a supplemental header, the supplemental header specifies the plurality of header fields used to generate the message digest;
   generating a digital signature based on the message digest;
   embedding the set of header fields, the supplemental header, and the digital signature into a response header; and
   transmitting a response message, the response message includes the response header and the at least a portion of the first resource,
   wherein the plurality of header fields is a subset of the set of header fields;
   the response header is an HTTP response header;
   the first resource comprises a file;
   the supplemental header comprises a non-standard HTTP header; and
   the response header includes a cache expiration field, the cache expiration field specifies a time at which cached copies of the at least a portion of the first resource must be refreshed, the content expiration time is at a time prior to the cache expiration time.

2. The method of claim 1, wherein:
   the content identifier includes a uniform resource name; and
   the content expiration time is specified according to Greenwich Mean Time.

3. The method of claim 1, wherein:
   the response header includes a cache expiration field, the cache expiration field specifies a time at which cached copies of the at least a portion of the first resource must be refreshed, the content expiration time is specified relative to the cache expiration time.

4. The method of claim 1, wherein:
   the generating a digital signature includes using an asymmetric signature algorithm.

5. The method of claim 1, wherein:
   the transmitting includes transmitting the response message to a content delivery network.

6. The method of claim 1, further comprising:
   establishing a secure connection with a proxy server; and
   the transmitting includes transmitting the response message to the proxy server.

7. An electronic device for verifying the authenticity of a first resource, comprising:
   a network interface, the network interface transmits a first request for a first resource, the network interface receives a response to the first request from a content delivery network, the response includes a header and at least a portion of the first resource, the header includes a content identifier field and a content expiration field, the header further includes a digital signature and a supplemental header, the supplemental header specifies a plurality of header fields used to generate a message digest, the plurality of header fields includes at least one of the content identifier field or the content expiration field, the digital signature is generated using the message digest; and
   a processor, the processor verifies that the at least a portion of the first resource is authentic by decrypting the digital signature and comparing the decrypted digital signature to a hashing of the plurality of header fields specified m the supplemental header and the at least a portion of the first resource,
   wherein the plurality of header fields is a subset of a set of header fields included within the header;
   the header is an HTTP response header;
   the first resource comprises a file;
   the supplemental header comprises a non-standard HTTP header; and
   the header includes a cache expiration field, the cache expiration field specifies a time at which cached copies of the at least a portion of the first resource must be refreshed, the content expiration field specifies a content expiration time at which the at least a portion of the first resource is no longer valid, the content expiration time is at a time different than the cache expiration time.

8. The electronic device of claim 7, wherein:
   the content identifier field associates the at least a portion of the first resource with a uniform resource name; and
   the processor discards the at least a portion of the first resource if authentication of the at least a portion of the first resource fails.

9. The electronic device of claim 7, wherein:
   the content expiration field specifies a content expiration time at which the at least a portion of the first resource is no longer valid, the content expiration time is specified according to Greenwich Mean Time.

10. The electronic device of claim 9, wherein:
    the processor verifies that the content expiration time plus a time specified by a given window of time has not occurred.

11. The electronic device of claim 7, wherein:
    the digital signature is generated using an asymmetric signature algorithm.

12. The electronic device of claim 11, wherein:
    the processor verifies that the digital signature was created using the content identifier field, the content expiration field, and the at least a portion of the first resource.

13. The electronic device of claim 11, wherein:
    the processor executes verification software, the verification software acquires a public key from a trusted third party, the verification software uses the public key to decrypt the digital signature.

14. The electronic device of claim 11, wherein:
the processor executes verification software, the verification software acquires a public key from a secure location on a local storage device, the verification software uses the public key to decrypt the digital signature.

15. One or more storage devices containing processor readable code for programming one or more processors to perform a method comprising the steps of:
receiving a first request for a particular game update;
establishing a secure connection with an origin server;
sending a second request for the particular game update to the origin server;
receiving a response to the second request from the origin server, the response includes the particular game update;
generating a first header field associated with a content identifier for the particular game update;
generating a second header field associated with a content expiration time for the particular game update;
determining a plurality of header fields corresponding with a message digest, the plurality of header fields includes at least one of the first header field or the second header field;
generating the message digest, the generating the message digest includes hashing the plurality of header fields and at least a portion of the particular game update;
generating a supplemental header, the supplemental header specifies the plurality of header fields used to generate the message digest;
generating a digital signature based on the message digest;
embedding the first header field, the second header field, the supplemental header, and the digital signature into a response header; and
transmitting a response message to a content delivery network, the response message includes the response header and the particular game update,
wherein the response header is an HTTP response header;
the supplemental header comprises a non-standard HTTP header; and
the response header includes a cache expiration field, the cache expiration field specifies a time at which cached copies of the particular game update must be refreshed, the content expiration field specifies a content expiration time at which the particular game update is no longer valid, the content expiration time is at a time equal to the cache expiration time.

16. The one or more storage devices of claim 15, wherein:
the content identifier field includes a uniform resource name; and
the content expiration field includes a time specified according to Greenwich Mean Time.

17. The one or more storage devices of claim 16, wherein:
the digital signature is generated using an asymmetric signature algorithm.

* * * * *